3,162,514
METHOD OF RECOVERING ACROLEIN AND METHACROLEIN PRODUCED BY OXIDATION OF OLEFINS
Otto Roelen, Oberhausen-Holten, and Walter Rottig, Oberhausen-Sterkrade-Nord, Germany, assignors to Ruhrchemie Aktiengesellschaft, Oberhausen-Holten, Germany, a German corporation
Filed Oct. 30, 1962, Ser. No. 234,196
Claims priority, application Germany Nov. 22, 1961
11 Claims. (Cl. 55—31)

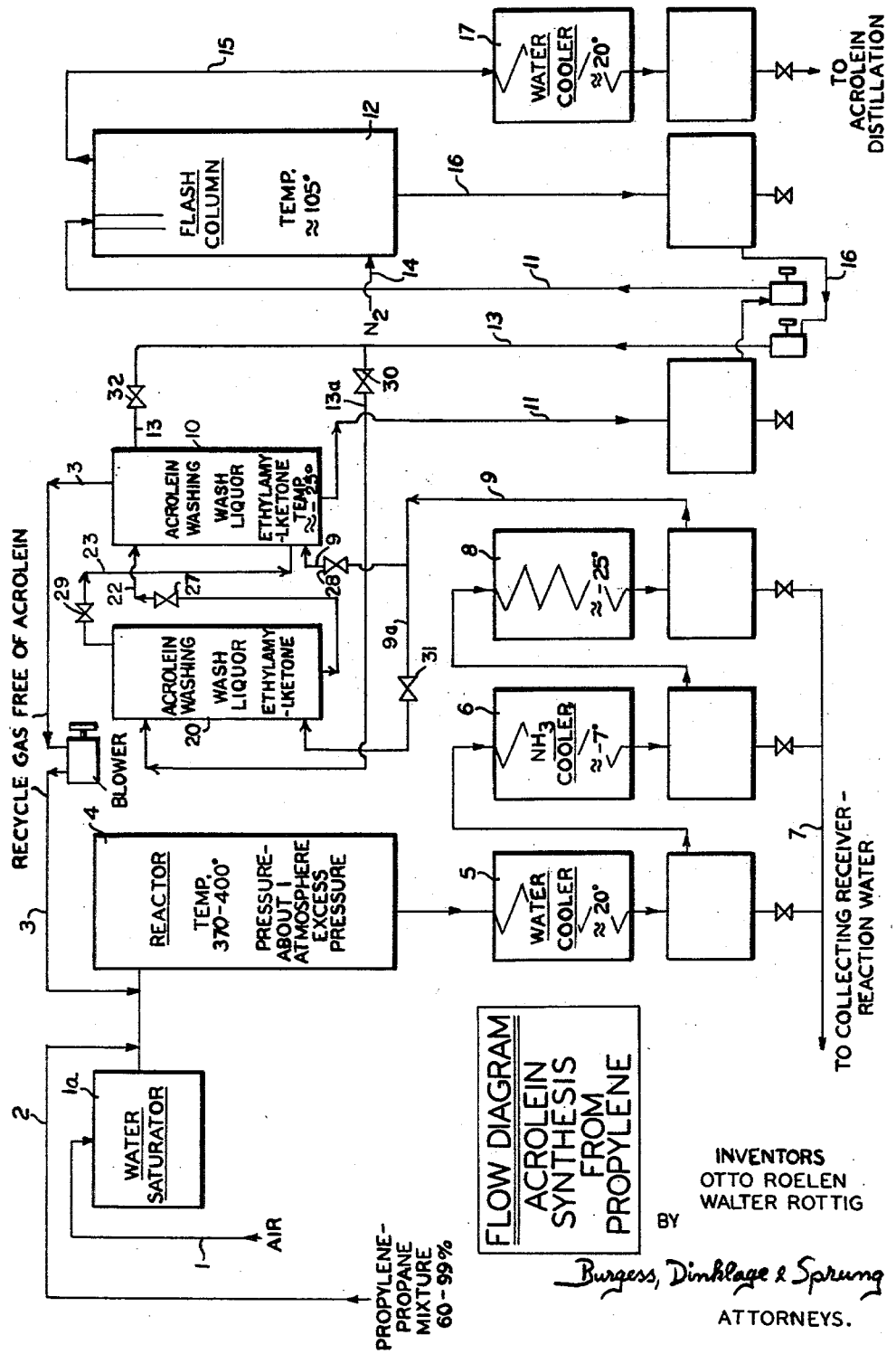

The catalytic oxidation of olefins in the gaseous phase, particularly of propylene or isobutylene, is generally carried out at pressures of below 5 kgs./sq. cm. gauge and at temperatures of between 300 and 500° C. It results in reaction products which comprise oxygenated compounds, preferably the unsaturated aldehydes acrolein or methacrolein, and minor amounts of acetaldehyde, formaldehyde, esters, and acids. The removal of the reaction products mentioned above from the reaction gas is effected in most cases by washing with water. In this case, relatively large amounts of water must be used due to the high vapor pressure of most of the individual components. Due to this fact, the concentration of organic compounds in the washing water is low and necessarily requires a large distilling unit for the recovery of the products and consequently high investment cost so that a considerable burden is placed on the finished products obtained from the economic point of view.

A further disadvantage of the washing with water is the fact that the resultant reaction products generally form azeotropic mixtures with water, i.e., are not directly obtained in anhydrous form but require further physical or chemical processing which gives rise to additional expenses.

The disadvantages described above are overcome by the process of the invention. It has been found that the washing and distillation for the recovery of acrolein and methacrolein, respectively, produced in the catalytic oxidation of propylene or isobutylene, and of the oxygenated by-products concomittantly formed is carried out particularly advantageously by removing extensively the water present in the reaction product gas, thereafter washing the gases with saturated aliphatic ketones or ketone mixtures having from 4 to 14 and preferably from 5 to 12 carbon atoms at a temperature and pressure and for a time sufficient for the ketone to take up aldehyde from the gas, and thereafter removing unsaturated aldehyde from the ketone as, for example, by driving off the oxygen-containing organic compounds from the enriched washing liquid by distillation in a flash column.

A large part of the reaction product gas derived from the catalytic oxidation of aliphatic olefins and to be processed consists of acrolein when using propylene and of methacrolein when using isobutylene. In addition to these main products, acetaldehyde, formaldehyde, esters and acids as well as saturated hydrocarbons, oxygen and water vapor are found in the reaction product gas. The gas mixture is first passed through an air-cooled condenser to condense part of the water present. Thereafter, condensation of additional amounts of water and minor portions of the reaction products is effected by further cooling, e.g., by means of a water-cooled condenser. More than 80% and preferably more than 90% of the water present should be removed in the two condensation steps. After removal of the bulk of the water, the reaction gas is passed to further cooling steps. It is desirable that the temperature used in the cooling step before the gas is washed with ketone be controlled such that as much of the residual water as is possible is removed, e.g., by means of a tubular cooler operating in the temperature range of between about −3° and −10° C. and followed, if necessary or desired, by a second cooler operated at temperatures of between about −15° and −50° C. and preferably between −20° and −30° C. It is desirable for satisfactory operation of the ketone scrubbing unit that the water content before the entrance to the scrubbing unit be lowered to less than 20 gms./normal cu. m. and preferably to less than 10 gms./normal cu. m., e.g., to a level between about 2 and 6 gms./normal cu. m. While different methods such as, for example, use of molecular sieves, of silica gel etc. can be used for the removal of the water, a more convenient method is to pass the gas leaving the water-cooled condenser through a preliminary stage already fed with ketone and having only unimportant or no means for gas distribution before the gas is passed to the ketone scrubbing unit proper. Essential in this preliminary stage is the adjustment of temperature which is controlled such that part of the condensed water and preferably the bulk of total water present is obtained in liquid form and may then be withdrawn continuously or intermittently. The washing liquid used in this preliminary stage is the same ketone as in the subsequent washing unit.

After the water content in the reaction gas which, for example, still contains by far the greatest part of the acrolein formed has been brought to a very low level, the reaction gas enters the ketone scrubber proper. This scrubber comprises one or several washing stages, one stage being generally sufficient. Scrubbing with ketones may be effected with cocurrent contact or preferably counter-current contact over filling bodies, e.g., Raschig rings. Other principles of washing are also applicable such as, for example, spraying of the washing liquid with nozzles or use of scrubbers equipped with bubble cap trays or trickling trays.

The pressure used in the scrubber is generally the same as that under which the catalytic oxidation is carried out. In many cases, it is 1 to 3 kgs./sq. m. and, in case of fixed-bed oxidation catalysts, depends upon the pre-pressure necessary to overcome the resistance the fixed bed offers to the flow. It is also possible, however, to arrange a compression unit downstream of the reactor to increase the pressure of the gas to be washed to a level which is higher than that used in the reaction itself, e.g., to a level of about 25 kgs./sq. cm. gauge. In this case, the scrubbing temperature may be increased correspondingly. It is advantageous to maintain the same pressure throughout the condensation. In special cases it may be preferable to operate the ketone scrubber at a higher pressure.

The temperature used in the scrubber ranges between about room temperature (at elevated pressure) and −50° C. (at 1 to 3 kgs./sq. cm. gauge), preferred being temperatures between about −10° and −30° C. When operating with two or more stages, the temperatures of the different stages must be adapted to one another. In general, the operating temperature of a subsequent stage should be lower, e.g., about 20° C. lower, than the washing temperature of the preceding stage.

The temperature and pressure can be selected by those skilled in the art to provide the best operation for the particular conditions applying such as cost of cooling, etc., to provide optimum operation. In general the efficiency, based on the extent to which aldehyde is removed can be 90% or more.

The rate of which the gas is fed to the ketone scrubber is dependent upon the water content and the concentration of the reaction products in the gas as well as upon the type and efficiency of the washing method used and may, therefore, vary within very wide limits. It ranges between about 250 and 20,000 liters/liter of washing liquid/hour. Among the factors determining the gas flow rate is also the withdrawal, i.e., intermittent or continuous, of the washing ketone loaded to a greater or lesser extent. The load may be as high as about 25% of the washing liquid.

In the manner described above, all of the organic reaction products can be successfully removed from the reaction gas with an efficiency up to 98–99% and even more.

The recovery of the unsaturated aldehydes from the ketone can be by continuous or batch procedures known in the art for recovery of dissolved materials in solvents. Trouble may be encountered in the use of some distillation procedures, due to the fact that, for example, the extremely reactive acrolein relatively readily undergoes polymerization or reaction with other products, which does not only reduce the yield but also causes troubles and plugging in the distillation column due to separation of solids. The method described below has been found to be particularly advantageous for the recovery of the organic reaction products contained in the washing liquids.

The product mixtures, if desired after passage through a countercurrent heat exchanger to utilize the low temperature, are passed to a flash column. The liquid mixture is introduced into the column continuously, e.g., by means of a pump or other feeding mechanism, and enters the column through a dip pipe of suitable size which is dipped into the flash column. The column itself is preferably a packed column, the depth of immersion being largely dependent upon the dimensions of the column. In general, it ranges between 10 and 50% and preferably between 20 and 35%, based on the overall length of the column. The column is kept at an operating temperature which is dependent upon the liquid feed rate, the concentration of reaction products in the scrubbing liquid, the boiling range of the scrubbing liquid and the degree of stripping. The temperature generally ranges between about 60° and 125° C. and preferably between 75° and 110° C. The flash effect may be improved if desired by introducing at the bottom or at a point somewhat above the bottom of the column a weak inert gas current, e.g., nitrogen or carbon dioxide, the flow rate of which may be relatively low and which is led off at the top of the column together with the reaction products. The operating pressure of the column will generally be about atmospheric. In special cases, slightly elevated or reduced pressure may be used.

Due to the very short residence time in the column, reaction of acrolein and the other organic compounds with one another is largely avoided so that troubles and plugging of the column are substantially no longer encountered. A uniform stream of the reaction products flows off at the top of the column and is condensed in a condenser arranged downstream of the column and followed, if desired, by an intense cooling unit. The washing medium used accumulates at a uniform rate in a receiver of suitable size at the bottom of the column, the washing medium containing substantially no reaction products and, which is very important for the scrubbing operation, no water. This washing medium can be returned into the low temperature scrubbing unit without any further treatment.

In certain cases, it has been found to be desirable to add small amounts of inhibitors to the washing liquids, e.g., hydroquinone or its monomethyl ether or other inhibitors known in the art.

The resultant reaction products are processed continuously or preferably in batch operation in a distillation unit. Acrolein or methacrolein of about 98 to 99% purity and even higher purity is obtained in addition to pure acetaldehyde and higher molecular weight esters and acids when using a distilling column having a suitable number of plates. Since access of water is substantially prevented by the precautions taken in the scrubbing unit and the flash distillation unit, the resultant organic compounds, as a rule, are anhydrous or have only an insignificant content of water.

The washing liquid which consists of ketones and, as described above, is constantly circulating may contain a certain amount of organic compounds after an extended period of operation, these compounds having been formed by secondary reactions during the course of this operating period. In general, this does not affect the washing effect of the organic compound so that a concentration of 10% or 20% of these compounds may be without an influence on the degree of washing or the efficiency of the washing liquid. If a decrease in washing effect will occur in individual cases, regeneration of the washing liquid will be necessary. The regeneration is generally effected by distillation in a still using slight vacuum if necessary or desired. In this manner, the ketones are recovered directly in sufficient purity and can be reused as washing liquid. This regeneration is generally necessary only after an operating period of about 8 to 12 months.

Ketones suitable for use in the process of the invention are ethyl amyl ketone, diisobutyl ketone, methyl amyl ketone, and mesityl oxide.

*Example*

Eight liters of a catalyst consisting of 10.7% $MoO_3$, 12.7% $Bi_2O_3$ and 76.7% silica were filled into a synthesis tube of 10 m. in length and 32 mm. in inside diameter which was heated electrically by means of a diphyl jacket and which was followed by air- and water-cooled condensers with corresponding receivers.

1100 normal liters of air were saturated with water vapor by means of a water saturator adjusted to a temperature of 75° C. and then 170 normal liters of propylene (99%) were added. The addition of propylene was effected just before the reaction tube. The recycle gas (1,500 normal liters/hr.) was also added at this point. The temperature between the saturator and the reactor was adjusted to about 100° C. to prevent any condensation of water.

A propylene conversion rate of 70% was achieved at a reaction temperature of 380° C.

Condensation of the reaction gas was first effected by means of an air-cooled condenser in the temperature range around 40° C. and thereafter the gas was passed through a water-cooled condenser at about 18° C. Under these conditions, about 85 to 90% of the water contained in the reaction gas was eliminated. The water contained formaldehyde, acetic acid, acrylic acid and certain amounts of acetaldehyde and acrolein.

The gas was further cooled by a two-stage cooler, the first stage of which was operating in the temperature range between —7° and —10° C. and the second stage of which was operating at a temperature of about —25° C. Additional amounts of water likewise containing certain amounts of reaction products were obtained in both stages. After the second stage, the reaction gas still contained about 1 gram of water per normal cu. m.

Thereafter, the gas was passed through a scrubbing unit filled with filling bodies and consisting of a tube of 70 mm. in inside diameter and 4.5 meters in length. The gas entered the washing unit at the base through an annular distribution pipe. The washing unit contained filling bodies of 8 mm. x 8 mm. and was maintained at a temperature of about —25° C. by means of ammonia cooling. Ethyl amyl ketone which was likewise precooled to —25° C. was continuously added at the top of the washing unit at a rate of 750 ml./hr. The gas leaving the washing unit was divided into two streams, one of which was returned to the reactor as recycle gas. The ketone which was loaded with the reaction products was continuously withdrawn at the base of the column. The load of reaction products on the ketone was about 20% by weight.

Under these conditions, more than 99.5% of the acrolein produced were washed out of the reaction gas. The efficiency of the washing unit ranged between 99 and 99.2%, based on total reaction products contained in the reaction gas.

When diisobutyl ketone was used in place of ethyl amyl ketone, an efficiency exceeding 99% was likewise obtained.

Methyl amyl ketone and mesityl oxide could also be used as washing liquids with the same good efficiency.

In case of the ethyl amyl ketone, the ketone loaded with about 20% by weight of reaction products was continuously fed at the top of a flash column which consisted of a tube of 60 mm. in inside diameter and 2 m. in length and was filled with Raschig rings of 8 mm. x 8 mm. The depth of immersion of the feed pipe at the top of the flash column was 60 cm. The temperature of the column was adjusted to 105° C. and a nitrogen stream of about 20 liters/hr. was continuously introduced at the lower end of the column. The feed rate of loaded washing liquid was 1 liter/hr.

Under these conditions, the entire mixture of reaction products could be distilled off at the top of the column. It was condensed by means of a water-cooled condenser and a certain portion of low-boiling products was separated in two series-connected liquid air traps maintained at —40° C.

The ketone freed from the reaction products was continuously withdrawn at the base of the column and immediately thereafter returned into the washing unit without any further treatment. The ketone contained substantially no detectable amounts of reaction products.

It has been found desirable in a continuous run conducted over months to add about 0.1 to 0.5% by weight of an inhibitor (hydroquinone for example) to the ketone.

The flash distillate consisting of the product obtained from the water-cooled condenser and the intense cooling unit was combined and processed batchwise in a glass column. About 90% of pure, largely water-free acrolein were obtained in addition to about 1% of propylene and about 4% of acetaldehyde. Further 2.5% by weight consisted of high boiling organic compounds comprising esters and acids. The balance of about 2.5% consisted of a residue of ethyl amyl ketone which could be returned directly into the washing unit.

The process can be operated in similar manner for production of methacrolein from isobutylene.

The invention is further described in the accompanying drawing, wherein FIG. 1 is a flow sheet for the recovery of unsaturated aldehyde according to the invention. Referring to the drawing, a reactor 4 for the air oxidation of olefin to produce acrolein or methacrolein receives air through line 1, saturated with water vapor by means of the water saturator 1a, olefin through line 2, and recycle through line 3. The effluent from the reactor 4 passes through a water-cooled condenser 5, then an ammonia-cooled condenser 6, and water is separated via line 7 from the condensers. The effluent then passes through a refrigeration cooler 8 wherein it is cooled to, for example, —25° C. to reduce the water content thereof to a suitable level. From the refrigeration cooler 8, the gas passes via line 9 to the scrubber 10. In the scrubber 10 the gas is passed countercurrent to ketone liquid used to take up the values in the gas. The scrubber 10 is operated at about —25° C. and the gas effluent from the scrubber 10 passes as the recycle gas stream through line 3. The liquid effluent from scrubber 10 passes via line 11 to the stripper 12. Nitrogen is introduced into the stripper 12 through line 14. The temperature of stripping is about 105° C. The product gas issues from the stripper and passes through line 15 to a water-cooled condenser 17 and to the rectification of acrolein. The liquid effluent of the stripper is ketone suitable for reuse in the scrubbing section and passes via line 16 to the scrubber.

As is stated above, the treating plant can include two washing units and where two washing units are used, the washing temperature of the subsequent stage can be about 20° lower than the washing temperature of the preceding stage. A second washing unit is indicated in the flow diagram. Thus, the washing unit 20 is connected with line 9 by the line 9a, and line 23 joins the top of washer 20 with the bottom of washer 10, so that the off-gas from washer 20 can be passed to the bottom of the washer 10. The washing liquid passes through line 13a to washer 20 and after passage through washer 20 flows to the top of washer 10 via line 22. The liquid recovered at the bottom of the washer 10 flows into line 11. Valves 27, 28, 29, 30, 31, and 32 are provided to permit selective operation with either one of the washers or both of the washers. To provide the desired temperature in the washers, suitable cooling coils can be installed therein.

What is claimed is:

1. In the production of unsaturated aldehyde selected from the group consisting of acrolein and methacrolein by oxidation of, respectively, propylene, and isobutylene, wherein a reaction product gas containing the unsaturated aldehyde and water vapor is produced, the improvement, for recovering of the unsaturated aldehyde from the reaction product gas, which comprises:
   (a) removing water from the reaction gas;
   (b) washing the resulting gas with saturated aliphatic ketones having about 4 to 14 carbon atoms to take up unsaturated aldehyde from the gas; and
   (c) stripping unsaturated aldehyde from the ketone.

2. The method of claim 1, wherein water is removed to reduce the water content of the gas to less than about 20 grams per normal cubic meter.

3. The method of claim 1, wherein water is removed to reduce the water content of the gas to less than about 10 grams per normal cubic meter.

4. The method of claim 1, wherein the ketone contains about 5–12 carbon atoms.

5. The method of claim 1, wherein the washing with ketone is at a temperature of about 0 to minus 50 degrees C.

6. The method of claim 1, wherein the washing with ketone is at a temperature of about —10° to —30° C.

7. The method of claim 1, wherein the unsaturated aldehyde is removed from the ketone at a temperature of about 60°–125° C.

8. The method of claim 1, wherein the unsaturated aldehyde is removed from the ketone at a temperature of about 75°–110° C.

9. The method of claim 1, wherein the washing is conducted in at least two stages and the temperature of the stages decreases in the direction of flow of the reaction product gas.

10. The method of claim 1, wherein the unsaturated aldehyde is acrolein.

11. In the production of unsaturated aldehyde selected from the group consisting of acrolein and methacrolein by oxidation of, respectively, propylene, and isobutylene, wherein a reaction product gas containing the unsaturated aldehyde and water vapor is produced, the improvement, for recovery of the unsaturated aldehyde from the reaction product gas, which comprises:
   (a) removing water from the gas to reduce the water content thereof to less than about 20 grams per normal cubic meter;
   (b) washing the resulting gas with saturated aliphatic ketone having about 4 to 14 carbon atoms at a temperature of about 0 to —50° C. to take up unsaturated aldehyde from the gas; and
   (c) stripping unsaturated aldehyde from the ketone at a temperature of about 60–125° C.

References Cited in the file of this patent

UNITED STATES PATENTS 3,102,147    Johnson _____ Aug. 27, 1963